US008892468B1

(12) United States Patent
Litle

(10) Patent No.: US 8,892,468 B1
(45) Date of Patent: Nov. 18, 2014

(54) CUSTOMER REFUNDS BY A MERCHANT AGENT

(75) Inventor: Thomas J. Litle, Concord, MA (US)

(73) Assignee: Litle & Co., Lowell, MA (US)

( * ) Notice: Subject to any disclaimer, the term of this patent is extended or adjusted under 35 U.S.C. 154(b) by 227 days.

(21) Appl. No.: 12/061,080

(22) Filed: Apr. 2, 2008

Related U.S. Application Data

(60) Provisional application No. 60/909,492, filed on Apr. 2, 2007.

(51) Int. Cl.
*G06Q 40/00* (2012.01)

(52) U.S. Cl.
USPC .................... 705/39; 705/35; 705/38; 705/42

(58) Field of Classification Search
USPC ...................................... 705/39–40
See application file for complete search history.

(56) References Cited

U.S. PATENT DOCUMENTS

| | | | | |
|---|---|---|---|---|
| 5,642,279 | A * | 6/1997 | Bloomberg et al. | 705/14.34 |
| 5,717,989 | A * | 2/1998 | Tozzoli et al. | 705/37 |
| 5,874,896 | A * | 2/1999 | Lowe et al. | 340/572.1 |
| 6,076,070 | A * | 6/2000 | Stack | 705/20 |
| 6,999,943 | B1 * | 2/2006 | Johnson et al. | 705/39 |
| 7,356,516 | B2 * | 4/2008 | Richey et al. | 705/80 |
| 7,496,536 | B2 * | 2/2009 | Lasater et al. | 705/38 |
| 2002/0069118 | A1 * | 6/2002 | Zylstra | 705/26 |
| 2002/0194128 | A1 * | 12/2002 | Maritzen et al. | 705/40 |
| 2003/0233292 | A1 * | 12/2003 | Richey et al. | 705/28 |
| 2004/0128155 | A1 * | 7/2004 | Vaidyanathan et al. | 705/1 |
| 2004/0193541 | A1 * | 9/2004 | Lasater et al. | 705/39 |
| 2007/0267479 | A1 * | 11/2007 | Nix et al. | 235/379 |
| 2008/0059351 | A1 * | 3/2008 | Richey et al. | 705/35 |
| 2008/0270298 | A1 | 10/2008 | McElroy et al. | 705/39 |
| 2009/0030710 | A1 * | 1/2009 | Levine | 705/1 |

OTHER PUBLICATIONS

Comptroller of the Currency Administrator of National Banks, Merchant Processing—Comptroller's Handbook, Dec. 2001, 99 pages.
Assurz, Inc., Frequently Asked Questions for Assurz 100% Satisfaction Guarantee service, Assurz, Inc., May 9, 2008, 2 pages (web page obtained from Internet Archive Wayback Machine on Dec. 29, 2011).

* cited by examiner

*Primary Examiner* — Hai Tran
(74) *Attorney, Agent, or Firm* — Ulmer & Berne LLP

(57) ABSTRACT

A customer can obtain a refund for a credit card purchase by interacting with an agent of the merchant. The existing payment infrastructure is used, but without the direct participation of the merchant and without generating a chargeback against the merchant. A customer request for a refund is received and validated against multiple data streams including sales data and/or fraud screening databases. For a validated refund request, refund data is stored in a refund database and communicated over the payment processing network to create the refund from the merchant to the customer credit card.

24 Claims, 3 Drawing Sheets

CUSTOMER REFUNDS BY A MERCHANT AGENT

This invention claims priority from U.S. Provisional Patent Application No. 60/909,492, filed Apr. 2, 2007, which is incorporated herein by reference.

FIELD OF THE INVENTION

The invention relates to customer refunds for credit card purchases.

BACKGROUND ART

When a customer presents a credit card to make a purchase from a merchant, a series of various actions:
Merchant authorizes credit card
Merchant requests payment from card issuer
Card issuer settles with merchant
Customer pays bill to card issuer FIG. 1 illustrates these steps. First, the purchase is authorized. The customer 101 presents a credit card to the merchant 102, where a computer terminal reads the information encoded in the magnetic stripe on the back of the card, and a clerk inputs the amount of the purchase. This information is then forwarded to the merchant processor 103 (or acquiring bank 104 acting as a merchant processor) who is an agent of the acquiring bank 104 and forwards the request for approval through the card association network 105, to an issuer's processor 106 who is an agent of the card issuing bank 107. The issuer's processor 106 approves or denies the request based on the decision of the card issuing bank 107, and passes the decision back along the chain to the merchant 102.

Specific details of the above may vary. For example, the customer 101 may provide the cardholder and order information to the merchant 102 by way of a mailed-in order form, a telephone call, or a web page. Or the merchant processor 103 may also be an acquiring bank 104 holding transaction accounts with merchant funds and the authority to transfer funds in and out of those accounts on behalf of the merchant 102. Or the merchant processor 103 and acquiring hank 104 may be separate entities. Similarly, the issuer's processor 106 and card issuing bank 107 may be separate entities as shown in FIG. 1, or a given card issuer may act as its own issuer's processor.

For an approved sale, the merchant 102 captures and records transaction data characterizing the purchase. At one or more times during each business day, the merchant 102 sends to the merchant processor 103 the sales data for that full or partial day, and the merchant processor 103 in turn submits the sales data into the card association network 105. The card association network 105 forwards the sales data to the issuer's processor 106 acting on behalf of the card issuing bank 107. The issuer's processor 106 or issuing bank 107 in turn can post the charges to the customer's credit card account for payment back to the card issuing bank 107 during the next monthly statement cycle.

The issuer's processor 106 acting on behalf of the card issuing bank 107 returns electronic payment for the purchase (deducting interchange fees) back through the card association network 105. The card association network 105 directs this payment (deducting association fees) back to the acquiring bank 104/merchant processor 103 for deposit into the merchant's account (deducting the merchant processor fee). Further background material regarding these processes is provided in *Merchant Processing—Comptroller's Handbook*, Comptroller of the Currency, Administrator of National Banks, December 2001, the contents of which are incorporated herein by reference.

For a credit card sale, each of the parties described above plays important role. But significant challenges arise to implement computer systems and software that coordinate the competing requirements of the multiple parties. Coordinating these complex processes requires efficient utilization of available computational and systemic resources.

Occasionally, a customer may dispute a specific charge. This may arise due to failure to receive the merchandise, inferior merchandise, an unauthorized transaction, etc. Under the rules of the card issuing organizations (Visa, MasterCard, etc.), the customer is supposed to contact the merchant first to attempt to resolve the dispute, for example, by issuing a refund for all or part of the sale price.

With reference to FIG. 1, the merchant 102 does not need any authorization from the card issuing bank 107 to make a refund. The merchant 102 simply sends the refund data to the merchant processor 103, who forwards the refund data over the card association network 105 to the issuer's processor 106 on behalf of the card issuing bank 107. The card issuing bank 107/issuer's processor 106 credits the customer's credit card account for the refund during the next monthly statement cycle. And the issuer's processor 106 acting on behalf of the card issuing bank 107 collects payment for the refund in the form of an offset (returning an approximation of the interchange fee) back through the card association network 105. The card association network 105 directs the refund offset back to the acquiring bank 104 (adding in the association feed) and the merchant processor 103 for payment from the merchant's account (adding the merchant processor fee).

But the above refund process is not optimal from the customer's perspective. One problem is that of having to contact the individual merchant for a given purchase may be difficult. The customer has to contact that particular merchant about the problem and then wade through an unfamiliar process that varies from merchant to merchant. Furthermore, the consumer may not be able to get a refund from the merchant, due to a number of issues. This can be a frustrating and time consuming process.

Rather than following this refund process, many customer cardholders simply contact the customer account issuing bank and complain. Also, a customer may not understand credit card issuer or association advertising correctly and think that they are supposed to contact the issuing bank directly. This usually results in the customer account issuing bank submitting what is known as a "chargeback" against the merchant for the amount of the transaction. Whereas a refund is issued by the merchant, a chargeback is issued by the card issuing bank.

In a typical chargeback process, the customer 101 contacts the card issuing bank 107 requesting a credit to address a charge problem. The issuer's processor 106 can act on behalf of the card issuing bank 107 to issue a credit to the customer's credit card account. The issuer's processor 106/issuing bank 107 also creates a chargeback transaction as an offset for the chargeback amount (plus interchange fee) back through the card association network 105. The card association network 105 directs the chargeback offset back to the merchant processor 103/merchant bank 104 for payment from the merchant's account (adding the merchant processor fee). By conditions of the agreement which are required to accept a card association's credit card, the merchant 102 must initially accept such a chargeback, which is counted as a customer service incident by the card association—even if it is reversed. Then the merchant 102 or the merchant processor 103 as agent of the merchant can initiate a dispute resolution process.

Although, at first it might seem that the financial effect on the merchant for a chargeback is the same as for a refund, that is not the whole story. The card issuing associations have many complex rules that can be quite onerous on the merchants. One such rule is that a merchant will be barred from honoring an issuing association's credit cards if chargebacks exceed 1% of the total transactions. Although the rules require that the merchant is supposed to be given an opportunity to resolve a customer dispute before the card issuing bank provides a chargeback, there presently is no mechanism to ensure that the merchant gets that opportunity. Applicant believes that in at least 50% of all chargebacks, the customer never attempted to resolve the problem with the merchant first, and has measured that number to be as high as 90% for some merchants. As explained above, in a chargeback from the card issuing bank, the merchant effectively has no opportunity at all to resolve or dispute the chargeback request. That is not fair to the merchant.

SUMMARY OF THE INVENTION

A customer can obtain a refund for a credit card purchase by interacting with an agent of the merchant. The existing payment infrastructure is used, but without the direct participation of the merchant and without generating a chargeback against the merchant. A customer request for a refund is received and validated against sales and/or other data in a merchant sales database. For a validated refund request, refund data is stored in a refund database and communicated over the payment processing network to create the refund from the merchant to the customer credit card.

In some specific applications, the agent of the merchant may be the merchant processor, while in other applications, the agent may be a separate entity distinct from the merchant and the merchant processor. In addition, the agent's refund expense (plus a processing fee) may be reimbursed by the merchant. And in some specific applications, the agent may work with the merchant to determine why the customer was unable or unwilling to contact the merchant directly.

Further specific applications include an adjudication process for the merchant to dispute the refund payment by the agent. In one specific example, instead of an immediate refund, the refund may be delayed by placing the refund in an escrow account until the adjudication is completed. If the merchant prevails, the refund is returned from the escrow account back to the merchant. Otherwise, the refund is completed to the customer credit card. In addition, merchant data and/or customer data may be analyzed to identify fraudulent activities.

The customer may be made aware of the availability of the merchant agent process through any of the existing payment processing entities, or through a separate outside party, for example, by use of a logo symbolizing the process. The refund request may be initiated by a phone call or an interactive web page.

DETAILED DESCRIPTION OF SPECIFIC EMBODIMENTS

Embodiments of the invention provide a refund to a customer for a credit card purchase by interaction with an agent of the merchant. The existing payment infrastructure is used, but without the direct participation of the merchant and without generating a chargeback against the merchant.

Figure 1:
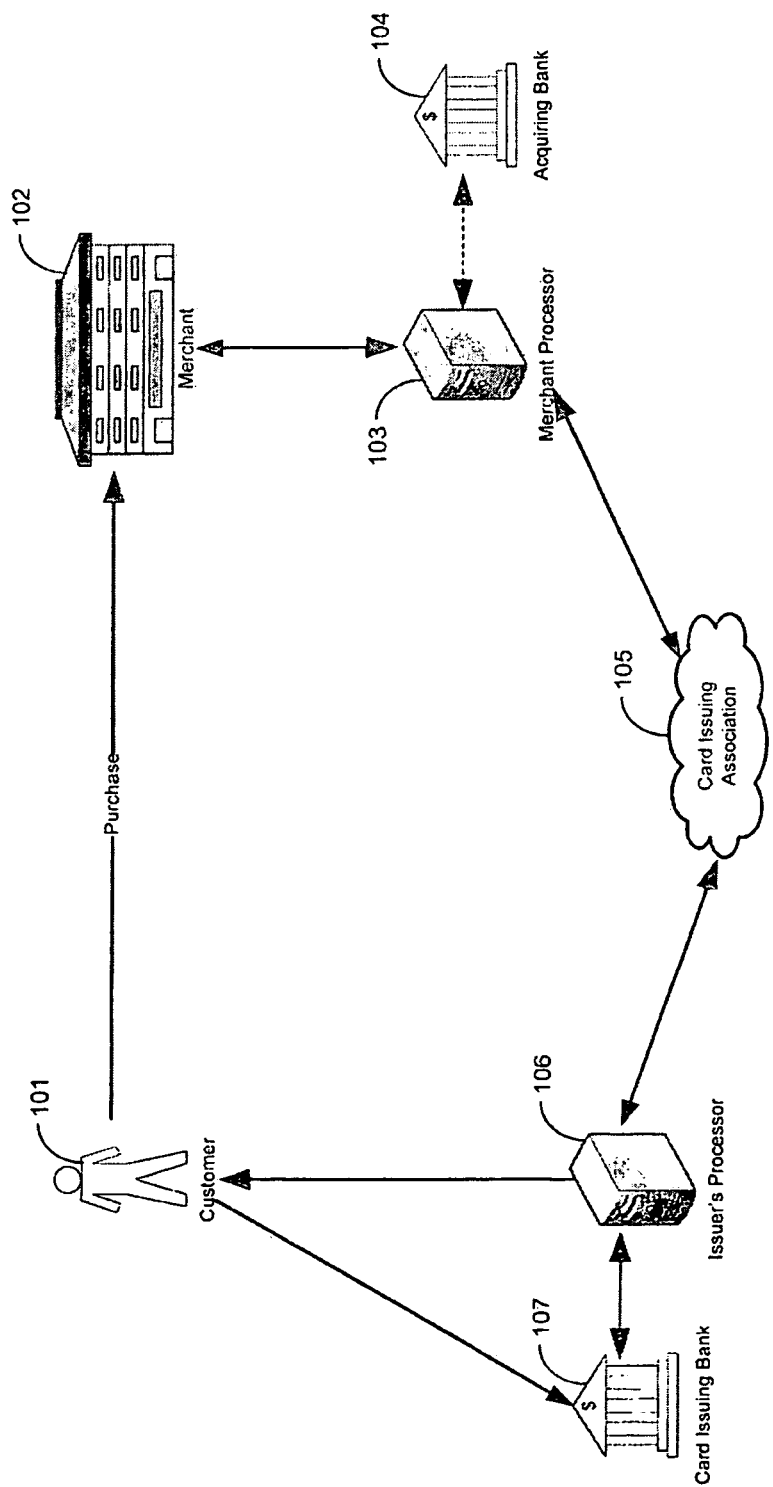
FIG. 1 illustrates the existing payment infrastructure showing various entities involved and process flows.
Figure 2:
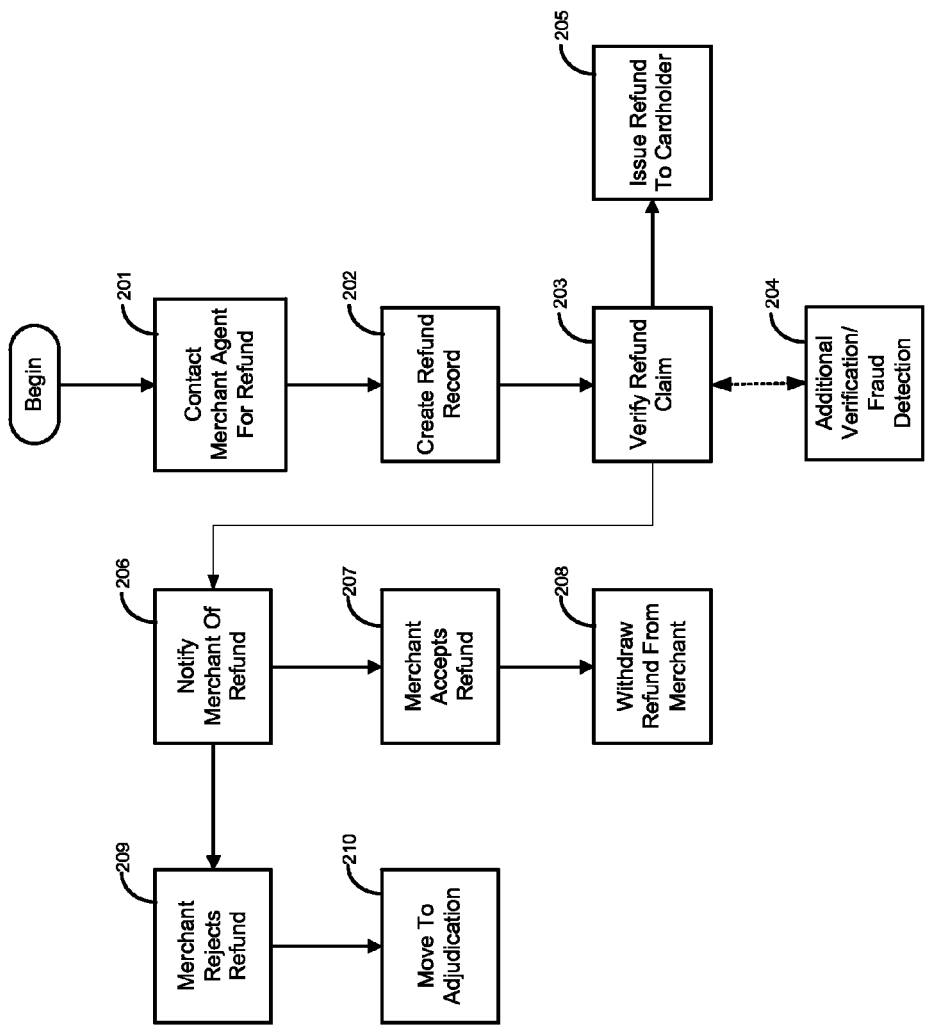
FIG. 2 shows the logical flow of a customer refund by a merchant agent according to one specific embodiment of the present invention.

FIG. 2 shows the logical flow of a customer refund according to one specific embodiment of the present invention. Rather than contacting their card issuing bank, a customer who is dissatisfied with a given purchase is directed to send their refund request to an agent of the merchant who is authorized to resolve the problem, step 201. For example, the agent may be an existing merchant processor, or a separate entity distinct from the merchant and the merchant processor. This request may be initiated, for example, by calling an 800 telephone number or by connecting to an interactive web page. The customer may be made aware of the availability of the merchant agent process through any of the existing payment processing entities, or through a separate outside party, or, for example, by use of a logo symbolizing the process. For example, the logo may explicitly or implicitly direct the customer to the available merchant agent interfaces (the 800 number or web page) for resolving any problems with a credit card purchase.

The merchant agent creates a unique case number which is used to identify a database record for the refund, step 202. Besides the case number, the refund record contains other relevant information regarding the transaction including the customer name, merchant name, product involved, date and location of the transaction, amount of the dispute, etc. The merchant agent also analyzes this data to validate that a legitimate refund claim has been presented, step 203. In some cases, the merchant agent may divert the refund request out of the normal process flow for additional verification or fraud detection, step 204. After validation of the refund request, the merchant agent acts on behalf of the merchant and authorizes and issues a refund back to the customer, step 205. The refund goes by way of the card association network, issuing bank/issuer's processor, and back to the consumer account (e.g., as a credit to their credit card account). Besides a refund back to the customer's credit card account, in some embodiments, the refund can be via an alternative payment device such as a stored-value card or a check. Thus, the customer receives a quick refund without a chargeback being created against the merchant.

The merchant agent also notifies the merchant of the refund, step 206. The merchant may accept the refund, step 207, in which case the merchant agent withdraws from a merchant account the amount of the refund and any processing fees, step 208, thereby reimbursing the agent for the refund, and the refund process is complete. Or, after receiving the refund notification, the merchant may choose to reject the refund, step 209, in which case a refund adjudication process occurs between the merchant and the agent, step 210, which may result in recharging the customer.

A specific delay period (for example, two or three business days) may be provided between validation of a legitimate refund claim, step 204, and issuing the refund back to the customer, step 205. Such a delay allows the merchant opportunity to dispute the refund and initiate an arbitration, as in steps 209 and 210. For example, the merchant agent may make a refund payment into an escrow account upon validating the refund request, with the refund being released from the escrow account after the delay period.

In some embodiments, the merchant agent may have direct access to a merchant account and authorization to immediate deduct any refunds. Then the refund issued in step 205 is funded directly from the merchant account (in addition to any processing fees), so there is no need for a separate step 208 to reimburse the merchant agent.

The various steps and transactions used in performing a merchant agent refund need to be handled as an accounting issue. In some embodiments, the merchant agent provides the accounting support so that the involved parties can follow the related transaction activity and address the financial implications.

Figure 3:
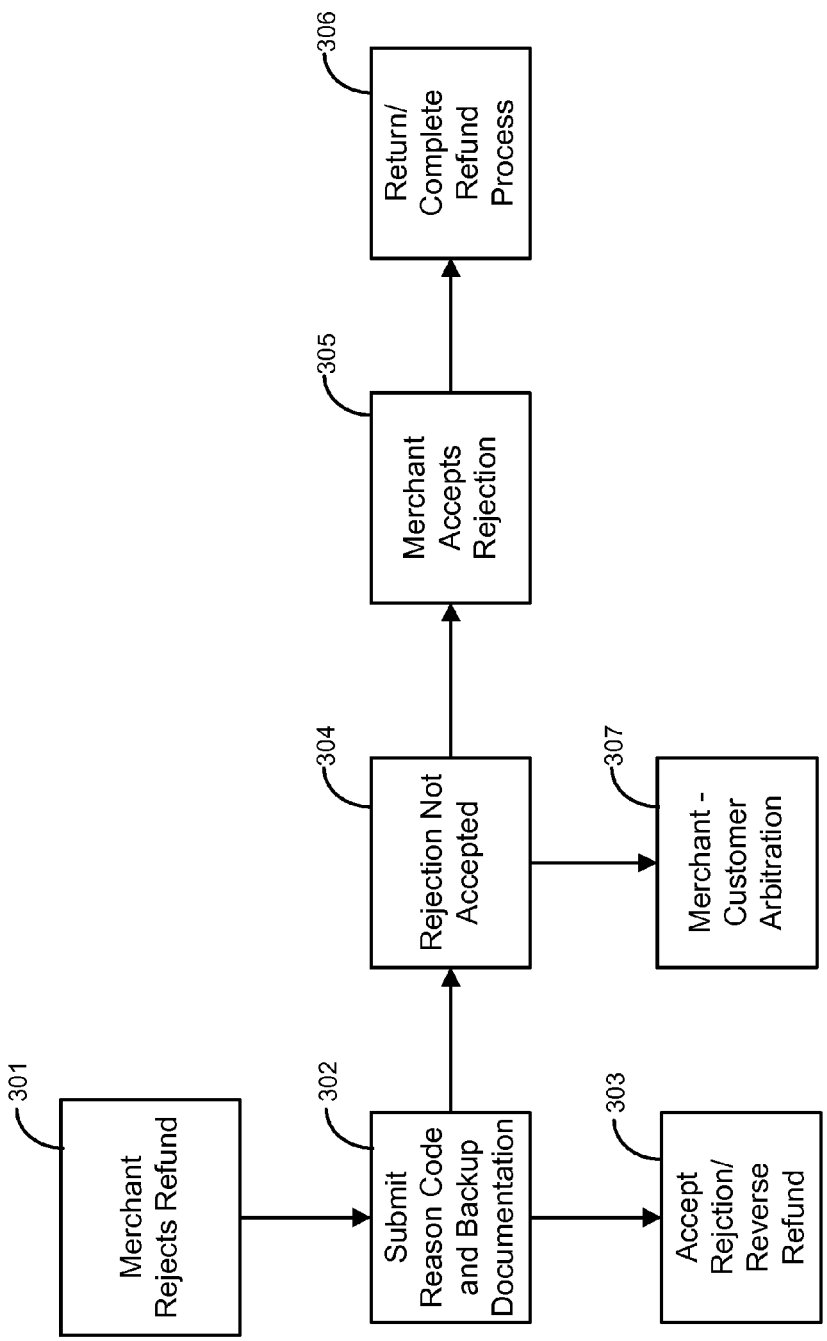
FIG. 3 shows an adjudication process for a merchant to dispute a refund.

FIG. 3 shows various steps in an adjudication process for a merchant to dispute a refund. After the merchant rejects a refund made by the agent, step 301, the merchant then submits a reason code and backup documentation to the agent, step 302. The agent may accept the merchant's position and reverse the refund, step 303. Depending on the specific architecture of the system, this may be accomplished in various ways. For example, if the refund was in an escrow status in the original refund process, reversing the refund would involve transferring the escrowed money back to the merchant account and the agent may then collect the funds paid back to the merchant (perhaps automatically) by submitting a corresponding sale transaction to the payment processing network.

If the agent does not accept the merchant's position, they inform the merchant of an adjudication rejection, step 304. The merchant may accept this rejection, step 305, in which case the original refund process is completed, step 306. If the merchant still maintains the disputed refund after rejection by the agent, step 305, the merchant may have the option of pursuing the matter further in a merchant/customer arbitration process, step 307.

Embodiments of the invention may be implemented in any conventional computer programming language. For example, preferred embodiments may be implemented in a procedural programming language (e.g., "C") or an object oriented programming language (e.g., "C++" or Java). Alternative embodiments of the invention may be implemented as preprogrammed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method to provide a refund of merchant funds to a customer credit card by a merchant agent that processes credit card transactions on behalf of a merchant, the merchant agent having a merchant agent processor in communication with the merchant and with a credit card company via a payment processing computer network, the method comprising:

receiving, by the merchant agent from a customer, a refund request for a purchase made from the merchant with the customer credit card;

generating, by the merchant agent processor, a refund record encoded with refund data associated with the refund request made to the merchant agent by the customer;

communicating the refund data by the merchant agent processor over the payment processing computer network as an agent of the merchant so as to cause the credit card company to create the refund to the customer credit card without the direct participation of the merchant and without the credit card company generating a chargeback against the merchant;

providing, by the merchant agent processor, the merchant with a dispute process representing an opportunity to dispute the refund request; and upon a successful dispute of the refund request by the merchant, submitting, by the merchant agent processor, a sale transaction to the payment processing computer network to cause the credit card company to charge the customer credit card at least the refunded amount.

2. A method according to claim 1, further comprising:
validating the refund request information against data stored in the refund record.

3. A method according to claim 1, further comprising:
prior to receiving the refund request, receiving, by the merchant agent processor, sales data from the merchant and submitting, by the merchant agent processor, a sales transaction to the payment processing computer network to cause the credit card company to charge the customer credit card a sales amount, wherein the refunded amount represents at least a portion of the sales amount, such that the credit card company receives from the merchant agent processor a sales transaction for the sales amount, a refund request for the refunded amount, and a sales transaction for at least the refunded amount without generating a chargeback to the merchant.

4. A method according to claim 1, wherein the dispute process further comprises:
adjudicating the disputed refund request to determine if the refund should be or should have been issued.

5. A method according to claim 1, wherein the dispute process further comprises:
delaying the refund until the dispute process is completed.

6. A method according to claim 5, wherein delaying the refund includes:
placing the refund in an escrow account, and
returning the refund from the escrow account to the merchant if the merchant prevails, or otherwise completing the refund to the customer credit card.

7. A method according to claim 1, further comprising:
including with customer purchases a logo indicating to the customer the availability of the merchant agent refund process for resolving problems associated with the purchases.

8. A method according to claim 1, wherein the agent of the merchant is a merchant payment processor.

9. A method according to claim 1, wherein the refund request is based on a telephone call.

10. A method according to claim 1, wherein the refund request is based on an interactive web page.

11. A method according to claim 1, wherein the refund request is based upon a written request.

12. A computer program product comprising a tangible, non-transitory computer readable storage medium having embodied therein program code for providing a refund of merchant funds to a customer credit card by a merchant agent processor of a merchant agent that processes credit card transactions on behalf of a merchant, the program code comprising:
program code for receiving a refund request made to the merchant agent by a customer for a purchase made from the merchant with the customer credit card;
program code for generating a refund record encoded with refund data associated with the refund request made to the merchant agent by the customer;
program code for communicating the refund data over a payment processing computer network as an agent of the merchant so as to cause a credit card company to create the refund to the customer credit card without the direct participation of the merchant and without the credit card company generating a chargeback against the merchant;
program code for providing the merchant with a dispute process representing an opportunity to dispute the refund request; and
program code for submitting, upon a successful dispute of the refund request by the merchant, a sale transaction to the payment processing computer network to cause the credit card company to charge the customer credit card at least the refunded amount.

13. A product according to claim 12, further comprising:
program code for validating the refund request information against data stored in the refund record.

14. A product according to claim 12, further comprising:
program code for receiving, prior to the refund request, sales data from the merchant and submitting a sales transaction to the payment processing computer network to cause the credit card company to charge the customer credit card a sales amount, wherein the refunded amount represents at least a portion of the sales amount, such that the credit card company receives from the merchant agent processor a sales transaction for the sales amount, a refund request for the refunded amount, and a sales transaction for at least the refunded amount without generating a chargeback to the merchant.

15. A product according to claim 12, wherein the program code for the dispute process further comprises:
program code for adjudicating the disputed refund request to determine if the refund should be or should have been issued.

16. A product according to claim 12, wherein the program code for the dispute process further comprises:
program code for delaying the refund until the dispute process is completed.

17. A product according to claim 16, wherein the program code for delaying further comprises:
program code for placing the refund in an escrow account, and
program code for returning the refund from the escrow account to the merchant if the merchant prevails, or otherwise completing the refund to the customer credit card.

18. A product according to claim 12, further comprising:
program code for including with customer purchases a logo indicating to the customer the availability of the merchant agent refund process for resolving problems associated with the purchases.

19. A product according to claim 12, wherein the agent of the merchant is a merchant payment processor.

20. A product according to claim 12, wherein the refund request is based on a telephone call.

21. A product according to claim 12, wherein the refund request is based on an interactive web page.

22. A product according to claim 12, wherein the refund request is based upon a written request.

23. Apparatus for providing a refund of merchant funds to a customer credit card by a merchant agent that processes credit card transactions on behalf of a merchant, the apparatus comprising:
a merchant interface for communication with the merchant;
a payment processing computer network interface for communication with a credit card company via a payment processing computer network; and
a merchant agent processor configured to:
receive a refund request from a customer for a purchase made from the merchant with the customer credit card;
generate a refund record encoded with refund data associated with the refund request made to the merchant agent by the customer,
communicate the refund data over the payment processing computer network as an agent of the merchant so as to cause the credit card company to create the refund to the customer credit card without the direct participation of the merchant and without the credit card company generating a chargeback against the merchant,
provide the merchant with a dispute process representing an opportunity to dispute the refund request, and,
upon a successful dispute of the refund request by the merchant, submit a sale transaction to the payment processing computer network to cause the credit card company to charge the customer credit card at least the refunded amount.

24. Apparatus according to claim 23, wherein the merchant agent processor is further configured to receive, prior to the refund request, sales data from the merchant and submit a sales transaction to the payment processing computer network to cause the credit card company to charge the customer credit card a sales amount, wherein the refunded amount represents at least a portion of the sales amount, such that the credit card company receives from the merchant agent processor a sales transaction for the sales amount, a refund request for the refunded amount, and a sales transaction for at least the refunded amount without generating a chargeback to the merchant.

* * * * *